T. BUMANN.
LIQUID RECEPTACLE.
APPLICATION FILED AUG. 24, 1908.
1,015,420.
Patented Jan. 23, 1912.
2 SHEETS—SHEET 1.
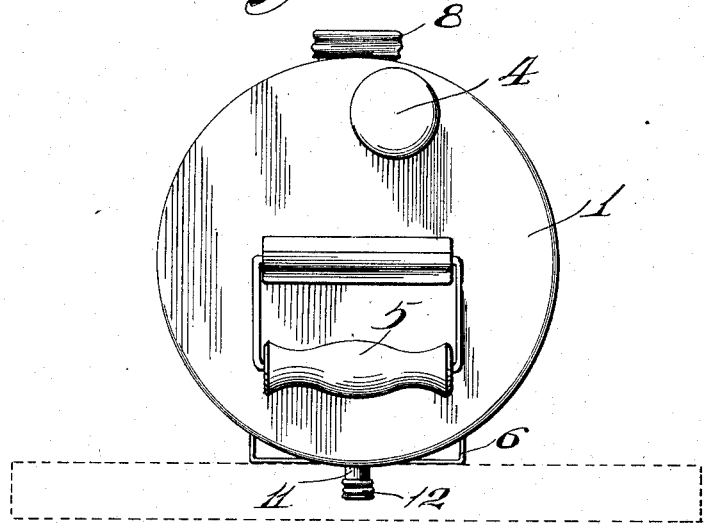
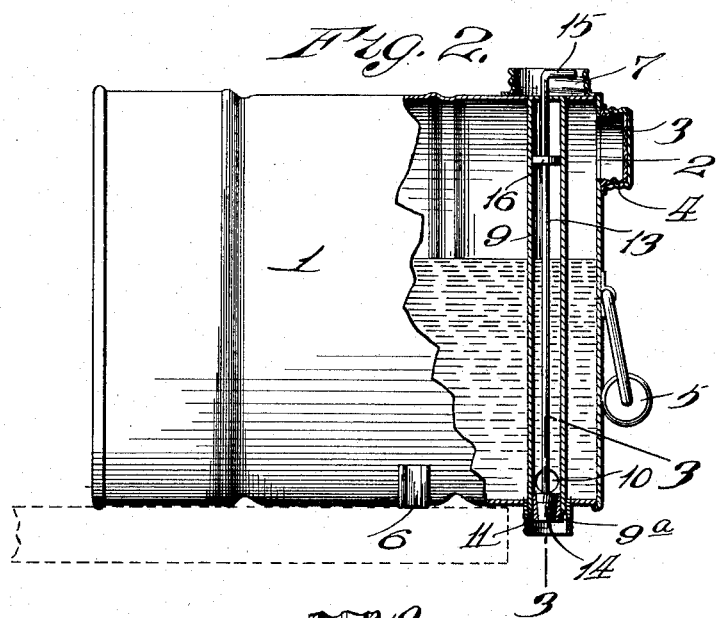
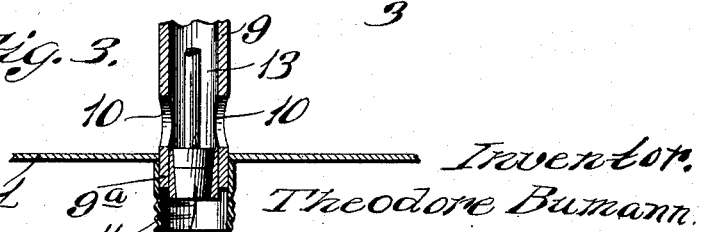
Attest.
H. G. Fletcher.
E. L. Wallace.
Inventor.
Theodore Bumann.
By Higdon & Longan.
attys.

T. BUMANN.
LIQUID RECEPTACLE.
APPLICATION FILED AUG. 24, 1908.
1,015,420.
Patented Jan. 23, 1912.
2 SHEETS—SHEET 2.
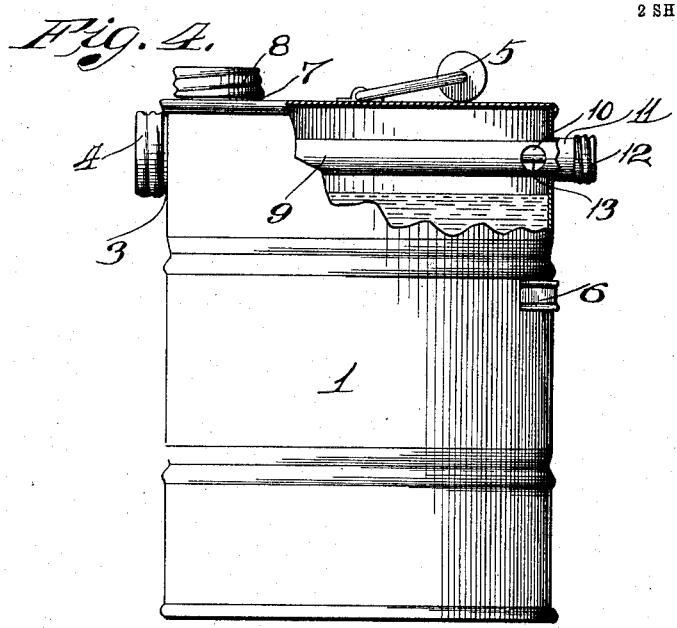
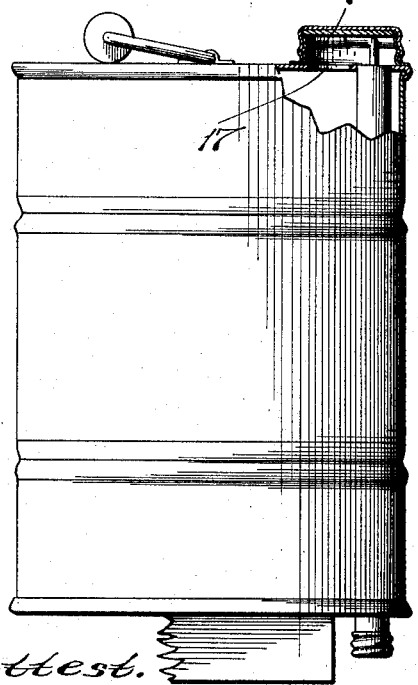
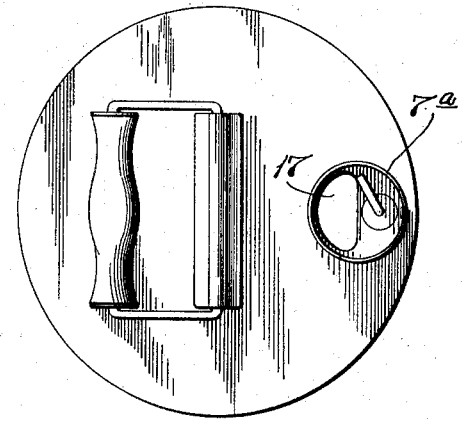
Inventor.
Theodore Bumann

UNITED STATES PATENT OFFICE.

THEODORE BUMANN, OF LITCHFIELD, ILLINOIS.

LIQUID-RECEPTACLE.

1,015,420.  Specification of Letters Patent.  Patented Jan. 23, 1912.

Application filed August 24, 1908. Serial No. 450,110.

*To all whom it may concern:*

Be it known that I, THEODORE BUMANN, a citizen of the United States, and resident of Litchfield, Illinois, have invented certain new and useful Improvements in Liquid-Receptacles, of which the following is a specification containing a full, clear, and exact description, reference being had to the accompanying drawings, forming a part hereof.

My invention relates generally to liquid receptacles, and more particularly to a receptacle or container which performs the function of a reservoir to hold a supply of liquid which is drawn from the receptacle as desired, and which receptacle is provided with simple means whereby the liquid is delivered to and discharged from said receptacle.

One of the objects of my invention is to construct an improved liquid receptacle for filling purposes in such a manner that the liquid contents may be readily discharged from the receptacle direct into the receiving container without the use of a funnel or like device.

To the above purposes, my invention consists in certain novel features of construction and arrangement of parts, which will be hereinafter more fully set forth, pointed out in the claim, and illustrated in the accompanying drawings, in which:

Figure 1 is a front elevation of a liquid receptacle of my improved construction; Fig. 2 is a side elevation of the receptacle with one end thereof in section; Fig. 3 is an enlarged detail section taken on the line 3—3 of Fig. 2; Fig. 4 is an elevation of the receptacle with a portion of one end in section; Fig. 5 is an elevation of a modified form of the receptacle with a portion of one end in section; and Fig. 6 is a plan view of the modified form of my improved receptacle.

Referring by numerals to the accompanying drawings: 1 designates the body of the receptacle, the same being of cylindrical form and closed at both ends, and formed in the top is an opening 2, around which is fixed a screw threaded collar 3, which is adapted to receive a screw threaded cap 4. Hinged to the top of the receptacle is a handle 5, by means of which said receptacle is lifted and carried, and fixed on the side of the body 1 is a bracket 6, which serves as a support for the receptacle and prevents the same from rolling when laid upon its side on a table or the like. Fixed to the upper portion of the body 1 on the opposite side from the bracket 6 is a threaded collar 7, which is adapted to receive a screw threaded cap 8, and fixed within registering diametrically-opposite twin apertures formed in the upper portion of the body 1 and extending from this collar 7 diametrically across the body of the receptacle is a single-piece straight tube 9, in the end of which, opposite the collar 7, is fixed a ring $9^a$, the opening through which tapers slightly to form a valve seat, and formed through said tube, immediately adjacent this ring, is a pair of apertures 10. The end of the tube 9 provided with this ring $9^a$ projects free slightly beyond the wall of the body 1, and fixed on said projecting end is a threaded collar 11, which normally receives a screw cap 12. Arranged to move lengthwise through the tube 9 is a rod 13, one end of which is provided with a conical valve plug 14, which fits snugly within the ring $9^a$, and the opposite end of said rod passes through the wall of the body 1 within the collar 7, and the outer end of said rod being bent laterally to form a handle 15. Fixed on this rod 13 within the tube 9 is a disk 16, which performs the function of a stop to limit the longitudinal movement of said rod. By reason of the fact that the tube 9 is straight and of uniform diameter, it (carrying the valve and valve seat) can be built up and inserted bodily from one side or one end of the can, thus facilitating the assembling of the parts, cheapening the cost of the can and enhancing the efficiency thereof in actual use.

The receptacle so constructed is filled by delivering the liquid through the opening 2, after which the screw cap 4 is seated on the collar 3 to close the filling opening, and when it is desired to discharge a portion of the liquid contents of the receptacle, said receptacle is horizontally disposed on a table or the like, with the bracket 6 resting on said table to prevent the receptacle from rolling in either direction. The caps 8 and 12 are now removed, after which the handle 15 is engaged, and by means of the same the rod 13 is elevated, which action withdraws the valve 14 from the ring $9^a$, and the liquid is now free to discharge through the apertures 10 and out through the collar 11 into the receiving receptacle, which is held immediately beneath said collar 11. When the proper amount of liquid has been discharged from the receptacle, the valve 14 is again seated in the ring 9ª by a downward movement of the rod 13, and after the caps 8 and 12 have been reseated upon the collars 7 and 11, the receptacle is moved into an upright position.

In the modified form of the receptacle seen in Figs. 5 and 6, the tube 9 is vertically disposed immediately adjacent the wall of the body of the receptacle, and formed through the top of the receptacle immediately adjacent the upper end of said tube and within the collar 7ª, which surrounds the upper end of said tube, is formed an opening 17, by means of which the liquid is delivered to the receptacle. This latter arrangement is particularly adapted for extra large receptacles.

A liquid receptacle of my improved construction is particularly adapted for holding a supply of liquid, portions of which are to be used or withdrawn from time to time, and by providing the discharge valve a liquid can be readily withdrawn without waste, and can be delivered direct to the receiving container without the use of a funnel or like device.

I claim:

An improved liquid receptacle for filling purposes, comprising the combination with a receptacle having a pair of diametrically opposite twin apertures, of a straight single piece tube having a uniform diameter and inserted bodily through one of said apertures from one side of said receptacle so that the first-inserted end of said tube projects free through the opposite aperture a distance beyond the outer surface of the receptacle, a valve seat fixed within the said projecting end of said tube, an operating rod carrying a valve at one end and inserted through the open end of said tube to place said valve within said valve seat, said rod extending in a straight line upon the interior of said tube from the said valve seat to the opposite end of said tube, and an operating handle on the end of said rod opposite the end which carries the valve, there being an opening in the said tube near the valve seat to permit liquid to pass to the interior of said tube.

In testimony whereof, I have signed my name to this specification, in presence of two subscribing witnesses.

THEODORE BUMANN.

Witnesses:
S. A. HALLFORD,
J. H. ATTERBURY.

Copies of this patent may be obtained for five cents each, by addressing the "Commissioner of Patents, Washington, D. C."